May 18, 1926.  
M. K. WILLIAMSON  
1,585,453  
INTERNAL COMBUSTION ENGINE  
Filed July 22, 1922 4 Sheets-Sheet 1

Inventor  
MAURICE KAYE WILLIAMSON

May 18, 1926.

M. K. WILLIAMSON

INTERNAL COMBUSTION ENGINE

Filed July 22, 1922

Inventor
MAURICE KAYE WILLIAMSON

C. P. Goepel
Attorney

May 18, 1926.

M. K. WILLIAMSON

INTERNAL COMBUSTION ENGINE

Filed July 22, 1922

Inventor
MAURICE KAYE WILLIAMSON

Attorney

May 18, 1926.

M. K. WILLIAMSON

INTERNAL COMBUSTION ENGINE

Filed July 22, 1922  4 Sheets-Sheet 4

1,585,453

Inventor
MAURICE KAYE WILLIAMSON

C. P. Goepel
Attorney

Patented May 18, 1926.

1,585,453

UNITED STATES PATENT OFFICE.

MAURICE KAYE WILLIAMSON, OF ADELAIDE, SOUTH AUSTRALIA, AUSTRALIA.

INTERNAL-COMBUSTION ENGINE.

Application filed July 22, 1922. Serial No. 576,741.

This invention relates to internal combustion engines, and more especially to the type of engine wherein piston rods rigidly attached to pistons transmit power to a crankshaft without the employment of a connecting rod; and wherein, preferably, two or more opposed cylinders or sets of opposed cylinders are arranged in co-axial alignment and are provided with pistons having piston rods which at or about their middle points engage the crank shaft but otherwise extend continuously from piston to piston.

There are several different types of engines or motors in which rigid piston rods connecting pistons working in cylinders in opposite alignment have been used. One example of this type of engine is that in which both the cylinders and the crank shaft rotate in the same direction, the crank shaft rotating twice as fast as the cylinders, the axis of the crank shaft being eccentric to the axis of rotation of the cylinders, the extent of such eccentricity being the radius of the crank shaft.

Another type of engine or motor of this description is one in which a secondary or additional crank is provided mounted upon the ordinary crank, hereinafter termed the primary crank, said secondary or additional crank being connected to the piston rod.

In engines or motors of this description and in consequence of the rectilinear reciprocating motion of the piston rods it is possible to provide the cylinders with covers or closed ends furnished with suitable glands and stuffing boxes through which the piston rods extend and reciprocate. In this manner that portion of the cylinder upon the side of the piston oppositely disposed to the combustion head forms a closed chamber the dimension of which alternately increases and diminishes and it may accordingly be used as a pump for supplying explosive mixture or air to the combustion chamber of the cylinder. This pump can deliver explosive mixture or air to the combustion chamber or to an intermediate receiver wherein it is stored under pressure and from which it is delivered to the combustion chamber at a required period during a cycle of work.

In this type of engine the cylinders are disposed and arranged in opposed pairs or couples and the pistons of each opposed pair are connected by a piston rod which at or about its middle point engages a crank pin of a secondary crank shaft. Each end of the secondary crank shaft is mounted or has its bearing in the arm of a primary crank shaft which in turn is supported in bearings carried by the crank case or engine framing. These primary crank arms are free to rotate round the axis of their primary crank shaft in their bearings, and the secondary crank shaft is likewise free to rotate about its axis in its bearings in the primary crank arms. The throw of the primary crank arms, that is the radial distance between the axis of the primary crank arms and the axis of the secondary crank shaft, is made exactly equal to the throw of the cranks of said secondary crank shaft.

With the co-acting parts arranged in this manner the axis of the secondary crank shaft will move in a circle about the axis of the primary crank arms, and simultaneously the crank pins of the secondary crank shaft will rotate around the axis thereof. The circle described by these crank pins has the same diameter as the circle around which the axis of the secondary crank shaft travels and owing to the constraining action of the piston rods said crank pins will describe a hypo-cycloid path which conforms to a straight line the length of which is equal to twice the diameter of either of said circles.

In engines hitherto constructed on the above principle it has been found that if the crank pins were guided in such rectilinear paths by the constraint of the piston rods alone that the latter would be subjected to lateral straining actions of a serious nature which repeatedly alternate in direction and cause rapid wear of the piston rods, stuffing boxes, and the cylinders.

Hitherto, engines having secondary cranks rotatively mounted upon primary cranks have not proved successful in continuous practical operation partly owing to trouble brought about by torsional vibrations set up by transference of energy to and from the flywheel. Such torsional vibrations set up relative movements of the primary and secondary cranks, thereby disturbing their alignment and causing excessive wear in the bearings and other parts.

According to the present invention means, hereinafter described, are provided whereby the crank pins are caused to move in a rectilinear hypo-cycloidal path independently of any constraining action by the piston rods, and the latter are accordingly rendered free from any transverse straining actions or forces. Lateral pressure of the pistons on the walls of the cylinders is consequently eliminated and mechanical losses due to friction from this cause and incidental to many different types of engines are obviated.

A salient feature of the invention resides in the provision of means whereby torsional vibrations and relative movements set up by transference of energy to and from the flywheel are eliminated. For this purpose an additional shaft is provided which is disposed parallel to the primary cranks and geared to the latter at its opposite ends. The primary cranks are thereby maintained in alignment in a positive manner and wear due to relative movements of the parts is obviated. This additional shaft may be geared to the primary cranks in an approved way and can be used for the transmission of power, and if the gearing be arranged in the necessary ratio the additional shaft can also function as a cam shaft and be provided with cams for mechanically operating the valves of the engine.

A further salient feature of the invention resides in the provision of means whereby perfect harmonic balance and smooth running is obtained when the engine is in operation.

In order that the invention may be readily understood reference will now be made to the accompanying drawings wherein:—

Figure 1:
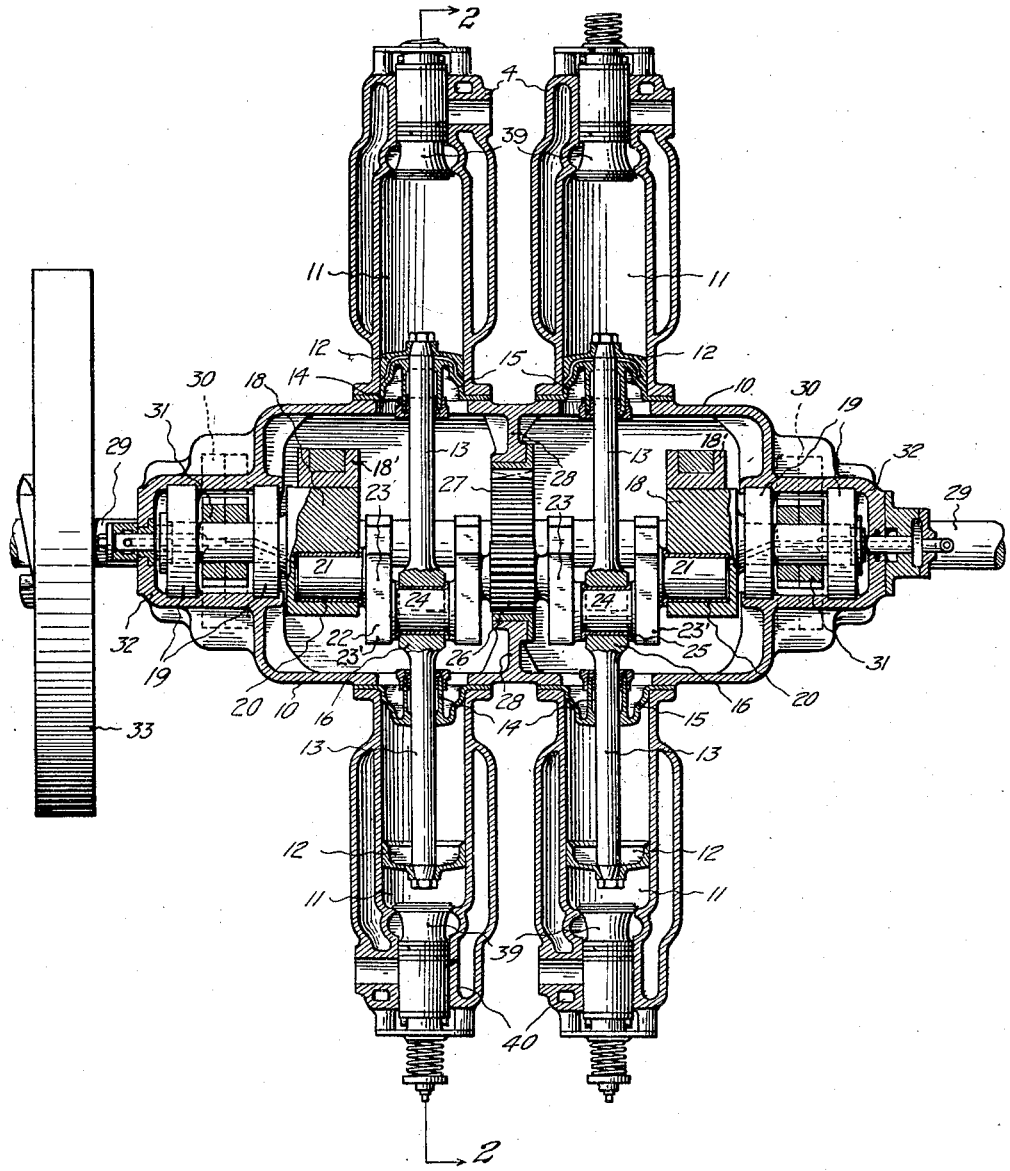
Figure 1 is a view in longitudinal section of an internal combustion engine constructed in accordance with the present invention and having opposed pairs of cylinders.

Figures 6, 7, 8, and 9 are diagrammatical views illustrating the operations during a working cycle of a pair of opposed cylinders of the engine shown in Figure 1.

In these drawings the numeral 10 designates a crank case or framing having cylinders 11 rigidly attached thereto by bolts or like fastenings and arranged in co-axially aligned pairs or couples on opposite sides of the said crank case.

Pistons 12, slidably fitting the cylinders 11, are rigidly fixed to piston rods 13 which extend through stuffing boxes 14 provided in covers 15 arranged at the outer ends of the cylinders 11, that is the ends of the cylinders 11 which adjoin the crank case 10.

Figure 2:
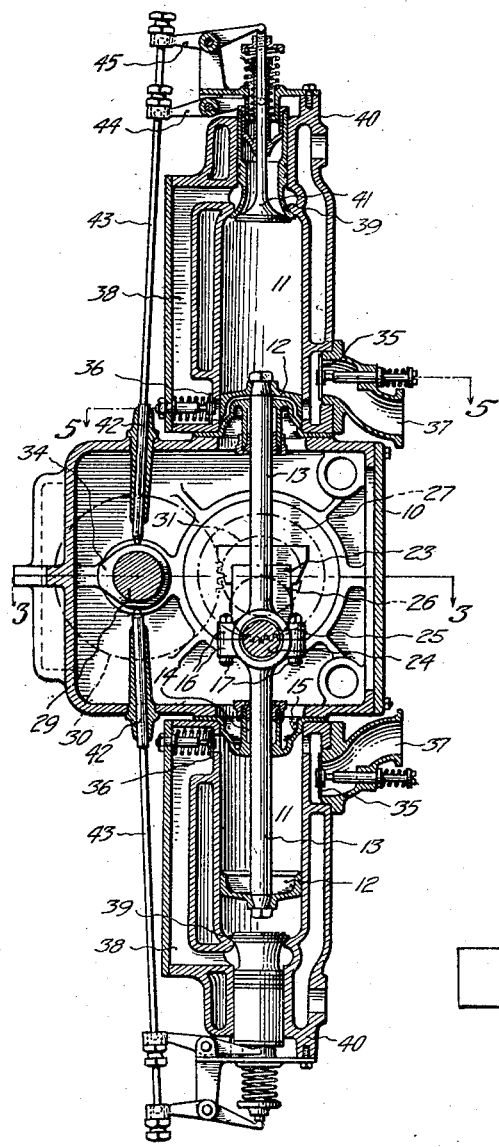
Figure 2 is a view in transverse section taken on the line 2—2 in Figure 1.

The portions of the piston rods 13 which project through the covers 15 are furnished with enlarged end bearings 16, and the contiguous enlarged ends 16 of an opposed pair of piston rods 13 are fixed rigidly together by bolts 17 Figure 2 or like means of connection. In this manner the piston rods 13 are united to form rigid connecting members which join together opposed pairs of pistons 12 and extend transversely through the crank case 10.

Alternatively the opposed piston rods 13 may be made in one piece and the crank pins of the secondary cranks can be "built up" to permit of the parts being assembled.

Primary crank shafts having cranks 18 arranged in co-axial alignment, are rotatively mounted in bearings 19 fixed or housed in the crank case 10. These primary cranks 18 are furnished at a required radial distance from their common axis with bearings 20, it being understood that this radial distance constitutes the throw or arm of said primary cranks 18.

In the bearings 20 are carried the ends 21 of a secondary crank shaft having cranks 23 formed thereon, the throw or arm of which is made exactly equal to the throw or arm of the primary cranks 18. The cranks 23 are furnished with crank pins 24 which fit in bearings carried by the enlarged parts 16 of each pair of interconnected piston rods 13.

If the primary cranks be rotated the secondary crank shaft 21 will move with them and its axis will describe a circular orbit or path about the common axis of the primary cranks 18.

When a pair of interconnected pistons 12 arrives at the end of a stroke the crank 23 to which it is connected and the arm of the primary cranks 18 are in longitudinal extended alignment, whereas in a mid-stroke position said crank 23 occupies a co-planar position relatively to said arm of the primary cranks, and the centre line of the crank pin 24 of the crank 23 becomes coincident with the common axis of the primary cranks 18.

The crank pins 24 rotate about the axis of the crank shaft 21 and move in hypo-cycloidal paths which are straight lines coincident with the common axes of the respective opposed cylinders 11, and of length equal to twice the diameter of the orbit of the secondary crank shaft 22.

It will be obvious to persons skilled in the art that if the crank pins 24 were guided in such rectilinear paths by the constraint of the piston rods 13 alone that the latter would be subjected to lateral straining actions of a serious nature which repeatedly alternate in direction and cause rapid wear of the piston rods 13, stuffing boxes 14, and the cylinders 11.

Such lateral straining actions are eliminated by the provision of mechanism whereby the crank pins 24 are moved in these hypo-cycloidal courses or paths independently of any constraining actions on the part of the piston rods 13.

For this purpose hypo-cycloidal gearing is employed and by its use the piston rods 13 are relieved of all lateral stresses and a smooth driving action is obtained between the secondary crank shaft 21 and the primary cranks 18.

It is well known that if a circle rolls, without slipping, around inside the periphery or the circumference of a circle having twice its diameter, a given point on the circumference of the former circle will describe a rectilinear hypo-cycloidal path which is a diameter of the latter circle.

Accordingly the secondary crank shaft 21 is provided with a pinion 26 or pinions the pitch circle diameter of which is made exactly equal to twice the throw of the secondary cranks 23 and therefore equal to the diameter of the circular orbit of the secondary crank shaft 21. This pinion 26 meshes with an internally toothed circular rack 27 the pitch circle diameter of which is made precisely twice that of the pinion 26 and accordingly equal to twice the diameter of the orbit of the secondary crank arm 23. This circular rack 27 is conveniently fixed in a partition 28 formed in the crank case 10. In lieu of using a centrally located single rack and planetary pinion as above described I may provide pinions on opposite ends of the secondary crank shaft adjacent to the primary cranks and having circular racks suitably mounted in the crank case and engaging the pinions.

As the crank pins 24 and the pinion 26 are concentrically disposed about the axis of the secondary crank shaft 21, and as the radius of the pitch circle of said pinion 26 is exactly equal to the throw of the cranks 23 it is obvious that if the axes or centre lines of said crank pins 24 are prolonged they will intersect the pitch circle of the pinion 26. The crank pins 24 will move as though they were located on the pitch circle of the pinion 26 and they will describe hypo-cycloidal paths which are diameters of the pitch circle of the circular rack 27. The diameter of the pitch circle of the circular rack 27 is equal to twice the diameter of the orbit of the secondary crank shaft 21, which as previously described is also the length of the hypo-cycloidal courses taken by the crank pins 24 when subjected to the constraining action of the piston rods 13 only. The hypo-cycloidal gearing will accordingly cause the crank pins 24 to move in the same hypo-cycloidal paths as they would do if under the constraining action of the piston rods 13 alone, and said crank pins 24 will trace these hypo-cycloidal courses even though the piston rods 13 be disconnected and removed.

It will be readily understood that by means of the pinion 26 and fixed circular rack 27 the piston rods 13 are relieved of all lateral straining actions and move freely through the stuffing boxes 14 with minimum friction, and that lateral pressure of the pistons 12 on the walls of the cylinders 11 is eliminated. Moreover the pinion 26 will roll or climb around the circular rack 27, rotating the secondary crank shaft 21 as it travels, and causing the ends 21 of said crank shaft thereof to exert an even torque or turning effort upon the primary cranks 18.

Figure 9:
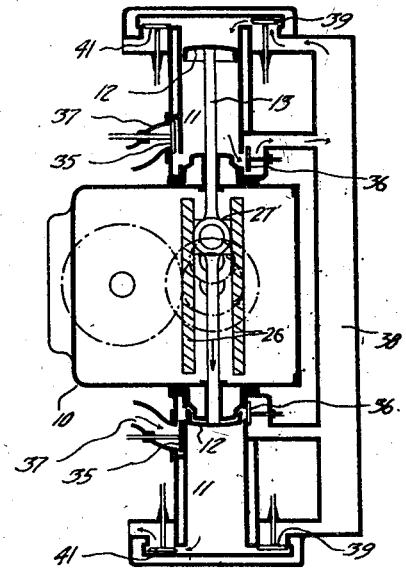

In lieu of employing the pinion 26 and circular rack 27 to relieve the piston rods of all lateral stresses I may form the inner ends of both pairs of piston rods integrally with rectangular sliding pieces 26' adapted to reciprocate in adjustable guides 27' located within the crank case 10 as shown in Figure 9.

In order to avoid straining actions in the primary cranks 18 and secondary crank shaft 21, due to torsional vibrations set up by the transference of energy to and from the flywheel, a lay shaft or additional shaft 29 is arranged in parallel alignment with said primary cranks 18 and secondary crank shaft 21.

This lay shaft 29 is furnished with gears 30 at its opposite ends which engage or mesh with pinions 31 fixed to the primary cranks 18.

The lay shaft 29 forms a mechanical coupling or linkage between the primary cranks 18, and effectively resists any inclination of the primary cranks 18 to over run each other and thereby disturb the alignment of the secondary crank shaft 21, and further said shaft 29 ensures at any given instant a uniformity of torque throughout said primary cranks 18 and the secondary crankshaft 21, and removes all torsion from the secondary crank shaft.

The gears 30 and pinions 31 are, preferably, provided with double helical teeth in order to eliminate back-lash and to ensure smoothness of action and silence in operation. In order that the gears 30 and pinions 31 may be protected and efficiently lubricated they are enclosed in housings 32 formed on the engine crank case 10.

The engine flywheel 33 is mounted on the shaft 29 and the latter is employed in the transmission of power from the engine for which purpose it can be provided with a pulley or other driving member.

Figure 3:
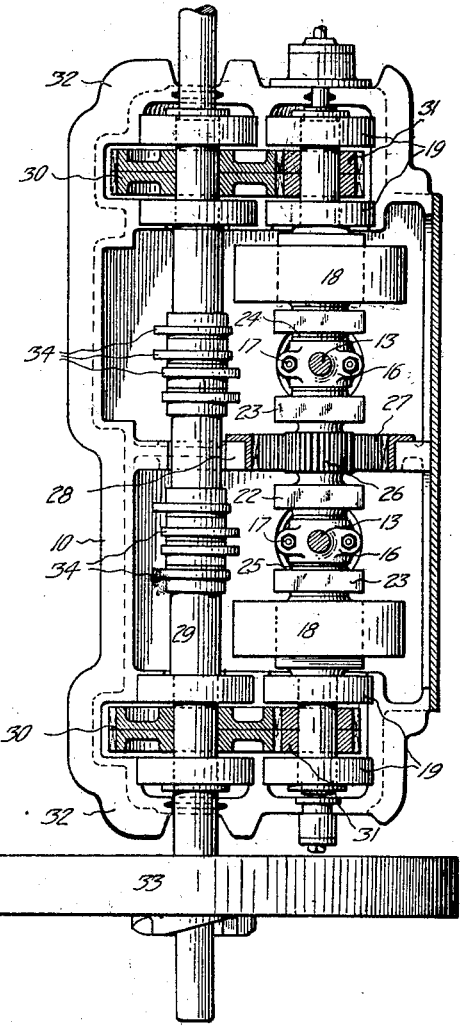
Figure 3 is a view in longitudinal section taken on the line 3—3 in Figure 2.

In a four-cycle engine the gears 30 and pinions 31 can be arranged in the usual ratio of two to one, and said lay shaft 29 can function as a cam shaft, and it can be provided with cams 34 Figures 2 and 3 for mechanically operating the valves of the engine.

The rectilinear motion of the crank pins 24, piston rods 13, and pistons 12, brought about by the use of the hypo-cycloidal gearing above described makes possible the employment of the covers 15 and stuffing boxes 14 at the outer ends of the cylinders 11.

As previously indicated the portions of the cylinders 11 situated on the sides of the pistons 12 remote from the combustion ends of said cylinders may operate as pumps, and are accordingly provided with inlet valves 35 and outlet valves 36. These valves 35 and 36 may function automatically or they can be operated mechanically by the cam shaft as preferred.

On the instroke of the pistons 12 explosive mixture is drawn through ducts 37 connected with a carburettor or other source of supply and passes through the inlet valves 35 into the pumping end of the cylinder. On the outstroke of the pistons explosive mixture is forced through the delivery valves 36 into a receiver or chamber 38.

Figure 4:
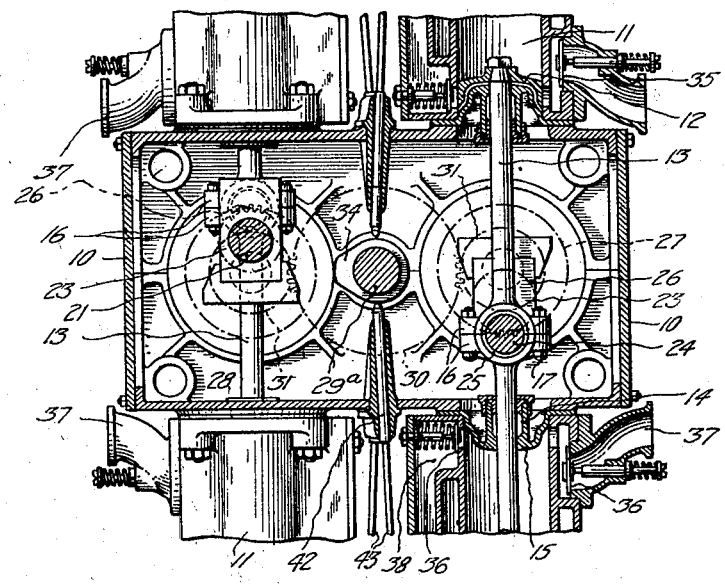
Figure 4 is a view partly in section, illustrating a modification of the invention.
Figure 5:
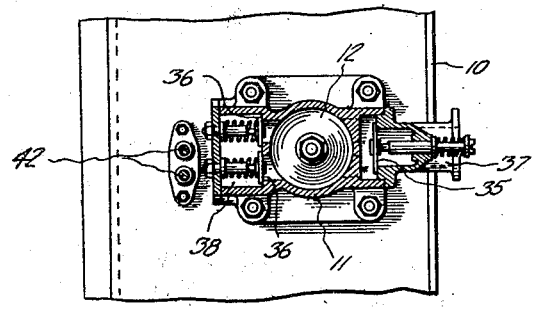
Figure 5 is a view in transverse section taken on the line 5—5 in Figure 2.

This receiver 38 may be formed integrally with each cylinder 11 as shown in Figures 2 and 4, or said receiver 38 may be constructed in such manner that it may be common to two or more cylinders. In the diagrammatic views shown in Figures 6, 7, 8 and 9 a receiver is shown which is arranged in communication with opposed pairs of cylinders 11.

Admission valves 39 are provided in the combustion heads or ends 40 of the cylinders, and explosive mixture passes from the receivers 38 through these admission valves 39 into the cylinders at required periods during a working cycle. These inlet valves 39 may be of hollow form as shown in Figures 1 and 2, and they can have exhaust valves 41 concentrically disposed within them. The combustion heads 40 of the cylinders can if preferred, be made of the usual L or T head form, or of other approved design, and they may be fitted with poppet valves of ordinary well known construction, or any other approved valve system may be used for controlling the passage of gases to or from either or both ends of the cylinders.

The valves 39 and 41 are, preferably, mechanically operated by means of the cams 34 mounted on the cam shaft 29 previously described, motion being imparted to said valves at required periods by means of tappets 42, push rods 43, and rockers 44 and 45. The rockers 44 and 45 are arranged to operate the admission valves 39 and exhaust valves 41 respectively.

Figure 6:
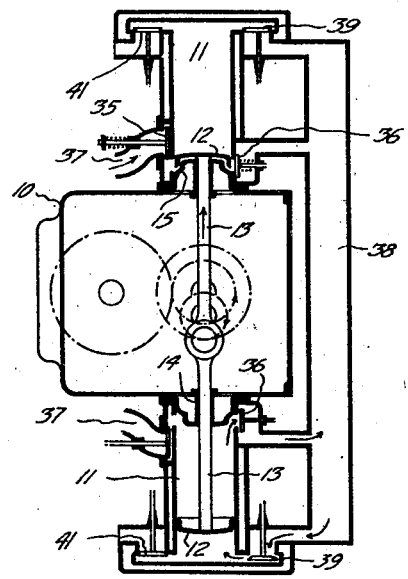

The working cycle of the engine can be readily followed by referring to the diagrammatical views shown in Figures 6, 7, 8, and 9. As shown in Figure 6 an interconnected pair of pistons 12 is about to commence an upward stroke, indicated by an arrow on the upper piston rod 13. During this stroke compression of a previously admitted charge of explosive mixture takes place in the working end of the upper cylinder, and explosive mixture is drawn into the pumping end thereof. Meanwhile the working end of the lower cylinder is being filled with explosive mixture through the admission valve 39 from the receiver 38, this explosive mixture having been previously forced therein by the pumping actions of the pistons. The pumping end of the lower cylinder during this stroke compresses and delivers a previously induced charge of explosive mixture into the receiver 38.

Figure 7:
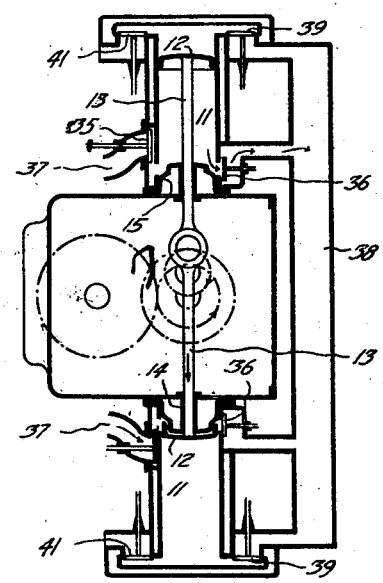
Figure 8:
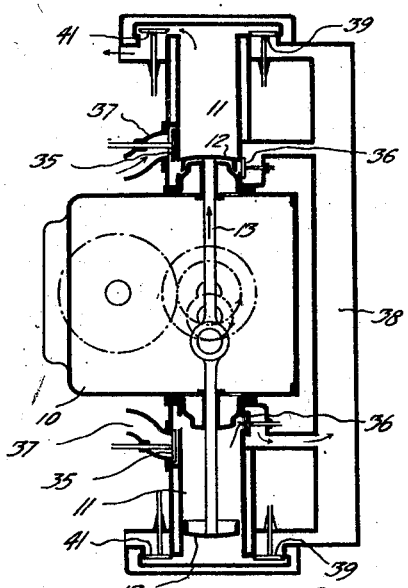

In Figure 7 the inter-connected pistons 12 are just commencing a downward stroke, the upper piston 12 moves through its explosion stroke and the pumping end of the upper cylinder compresses and delivers explosive mixture to the receiver 38. Compression takes place in the working end of the lower cylinder, while additional explosive mixture is induced into its pumping end.

A return upward stroke is about to begin in Figure 8. During this stroke the working end of the upper cylinder is exhausting and its pumping end is being filled with fresh explosive mixture from the source of supply. Simultaneously the lower piston 12 moves upwardly on its working stroke, and the pumping end of the lower cylinder compresses and delivers a further quantity of explosive mixture to the receiver 38.

The interconnected pistons 12 in Figure 9 are about to start on a second downward stroke during which the working end of the upper cylinder is filled with another charge of explosive mixture and the pumping end thereof delivers a second charge of explosive mixture to the receiver 38. Concurrently the working end of the lower cylinder is exhausting and the pumping end thereof is being re-filled with explosive mixture.

During these four strokes of the interconnected pair of pistons 12 each one of the opposed pair of cylinders passes through a complete cycle of work. On the succeeding upward stroke compression takes place in the upper cylinder, a further charge enters the working end of the lower cylinder and the cycle of operations is recommenced.

It will be observed that on each instroke of a piston 12 a charge of explosive mixture is induced from the source of supply into the pumping end of the cylinder in which the piston 12 is fitted, and on each outstroke of said piston this charge of explosive mixture is compressed and delivered to the receiver 38. Further it will be understood that during a complete working cycle of a cylinder explosive mixture to fill the cylinder once only, is taken from the receiver 38, whereas during the same period twice this volume is delivered to said receiver 38.

Explosive mixture, accordingly, becomes stored under pressure in the receiver 38 and on the induction strokes of the pistons 12 this mixture is pressure fed or "forced fed" to the cylinders, the admission valves 39 being timed to open during this period. At the commencement of the compression strokes of the pistons 12 the pressure in the cylinders is accordingly raised above that of the atmosphere and said cylinders are said to be "supercharged" with explosive mixture.

This super-charging of the cylinders considerably increases the thermal efficiency of the engine, and is of special value at high speeds when owing to throttling in the inlet passages and valves the pressure at the commencement of the compression strokes in engines of ordinary design is frequently lower than that of the atmosphere.

Various alterations in the arrangement and timing of the admission valves 39 and exhaust valves 41 may be made within the scope of the invention.

The admission valves 39 may be automatic and regulated in their operation by the relative pressures in the receivers 38 and cylinders or they may be mechanically operated as previously described. The exhaust valves 41 may be kept open for a small portion of the first part of an induction stroke so that a required proportion of cold air is drawn into the working end of each cylinder through the exhaust port or passage connected therewith, thereby cooling the exhaust valve 41.

Furthermore, the admission valves 39 may be timed to regulate the period or point of admission in such manner that loss of explosive mixture through the exhaust ports may be prevented, and the compression pressure regulated to a required degree.

By arranging the timing of the admission valves 39 to be controlled by a governor, the engine may be governed by varying the compression pressure and accordingly the impulses imparted to the pistons 12 on their power strokes.

The opposed pistons 12 and piston rods 13 of each pair of interconnected pistons are made as nearly as possible of equal weight, and being symmetrically disposed about a crank pin 24, their centre of gravity is positioned on the axis thereof. Accordingly each pair of interconnected pistons 12 with the piston rods 13 attached thereto can be perfectly balanced by masses located on the opposite side of the axis of the secondary shaft 22.

These masses are conveniently formed as extensions 23' of the cranks 23, and are symmetrically disposed about the diametral plane passing through the axis of the crank pins 24 and the axis of the secondary crank shaft 21, and their centres of gravity are positioned from the latter axis at distances proportional to their weights.

In a similar manner the secondary crank shaft 21 and the reciprocating masses attached thereto as pistons 12 and piston rods 13 can be perfectly balanced by the provision of suitable masses formed as opposite extensions 18' of the primary cranks 18 and located at required distances from the axis thereof, as will be readily understood.

In the modification of the engine illustrated in Figure 4, pairs of opposed cylinders 11 or pluralities of pairs of said cylinders, having pistons 12, piston rods 13, primary cranks 18, and secondary cranks 21, are disposed on opposite sides of a centrally located lay shaft $29^a$ having on its opposite ends gears 30 which mesh with pinions 31 on the primary cranks 18.

This lay shaft $29^a$ functions as a mechanical coupling or linkage between the opposite ends of both pairs of primary cranks 18 in the manner and for the purpose previously described. By arranging the gears 30 and pinions 31 in the ratio of two to one the lay shaft $29^a$ can be driven, in the case of a four-cycle engine, at one half the speed of the primary cranks 18, and said lay shaft $29^a$ may be provided with cams 34 for operating the admission valves 39 and exhaust valves 41 of the cylinders in the manner previously described.

The flywheel (not shown) of the engine is mounted on the lay shaft $29^a$ which also carries a power transmitting element as a pulley or the like.

The action and cycle of operations in this modified engine are similar to those previously described, and said engine can be made of great compactness and its working parts can without difficulty be disposed in such manner that they balance one another with exactness.

In the foregoing description the explosive mixture has been described as being forced by the pumping ends of the cylinders into the receivers 38 from which at required periods it is delivered to the working ends of said cylinders. It will, however, be obvious to persons skilled in the art that air alone may be compressed in the pumping ends of the cylinders and delivered to the receivers 38 in which it is stored under pressure and this stored air may be used to effectively scavenge the working ends of the cylinders. In this arrangement of the invention liquid fuel may be forced into the working ends of the cylinders at the end of the compression stroke or it may be drawn into the cylinder by injector action of the inrushing air.

I claim:

1. In an internal combustion engine, the combination of a crank casing, cylinders, pistons in said cylinders, primary crank members journaled on said crank casing, secondary driving connections between the pistons and said primary crank members, a lay shaft journaled on and extending through said crank casing in parallel relation to said primary crank members, and a driving connection between said lay shaft and primary crank members at each end of the crank casing.

2. In an internal combustion engine, the combination of a crank casing, cylinders, pistons in said cylinders, primary crank members comprising a crank section journaled on each end of the crank case in coaxial alignment with each other, secondary driving connections between the pistons and the two primary crank members, a lay shaft journaled on and extending through the crank casing parallel to the primary crank members, gears on said lay shaft adjacent to each of said primary crank members, and gears on said primary crank members which engage the aforesaid gears on the lay shaft to equalize the torsion on the crank members.

3. In an internal combustion engine, the combination of a crank casing, a pair of co-axially arranged opposed cylinders, a piston in each cylinder, a piston rod rigidly connected with said pistons, primary crank members comprising separated crank sections arranged on opposite sides of said piston rod in coaxial alignment with each other and journaled on said casing, a secondary crank shaft having its ends journaled in the arms of the primary crank shaft members and having a connection with said piston rod, a lay shaft for transmitting power journaled on and extending through the crank casing parallel to the primary crank members, gears on said lay shaft at opposite ends of the crank casing, and a gear fixed to the corresponding primary crank member in engagement with said gears on the lay shaft to equalize the torsion on the crank members.

4. In an internal combustion engine, the combination of a crank casing, a plurality of co-axially arranged cylinders, pistons within said cylinders, a piston rod rigidly connected with said pistons, primary crank members arranged in coaxial alignment journaled on said casing, a secondary crank shaft having its ends journaled in the arms of the primary crank members, a pinion mounted upon the secondary crank shaft, a fixed toothed rack engaging said pinion, constraining the crank pins on said secondary crank shaft to reciprocate in rectilinear hypo-cycloidal courses synchronously as the common axis of said secondary crank describes an orbit about the axis of the primary cranks, a lay shaft provided at its opposite ends with gears engaging pinions fixed to the primary crank members and a fly wheel mounted on said lay shaft.

5. In an internal combustion engine, the combination of a crank casing, a plurality of co-axially arranged cylinders, pistons within said cylinders, a piston rod rigidly connected with said piston, primary crank members arranged in co-axial alignment on said casing, a secondary crank shaft having its ends journalled in the arms of the primary crank members, hypo-cycloidal toothed members mounted upon, and connected with said secondary crank shaft, for constraining the crank pins to reciprocate in rectilinear courses, a lay shaft provided with gears at its opposite ends engaging pinions fixed to the primary crank members, and a fly wheel mounted on said lay shaft.

6. In an internal combustion engine, the combination of a crank casing, a plurality of co-axially arranged cylinders, pistons within said cylinders, a piston rod rigidly connected with said pistons, primary crank members arranged in co-axial alignment journalled on said casing, a secondary crank shaft having its ends journalled in the arms of the primary crank member, a planetary pinion on the secondary crank shaft, a fixed circular rack concentrically disposed with the axis of the primary crank members and co-acting with the planetary pinion to reciprocate the crank pins of the secondary crank in straight lines, a lay shaft provided with gears at its outer ends, engaging pinions fixed to the primary crank members, and a fly wheel mounted on said lay shaft.

7. In an internal combustion engine, the combination of a crank casing, a plurality of co-axially arranged cylinders, pistons within said cylinders, a piston rod rigidly connected with said pistons, primary crank members arranged in co-axial alignment journalled on said casing, a secondary crank shaft having its ends journalled in the arms of the primary crank members and having arms equal in length to those of the primary cranks, a planetary pinion mounted on the secondary crank shaft and having a pitch diameter equal to the diameter of the orbit described by the axis of the crank about the axis of the primary cranks, a fixed circular rack engaging said pinion, and having a pitch diameter equal to twice the diameter of said orbit, a lay shaft provided with gears at its outer ends engaging pinions fixed to the primary shaft members, and a fly wheel mounted on said lay shaft.

8. In an internal combustion engine, the combination of a crank casing, a plurality of co-axially arranged cylinders, pistons within said cylinders, a piston rod rigidly connected with said pistons, primary crank members arranged in co-axial alignment journalled on said casing, a secondary crank shaft having its ends journalled in the arms of the primary crank shaft, a lay shaft geared at its opposite end to the primary crank members in the ratio of two to one, valve operating cams, and a fly wheel mounted on said lay shaft.

9. In an internal combustion engine, the combination of a crank casing, a plurality of co-axially arranged cylinders, pistons mounted within said cylinders, a piston rod rigidly connected with said pistons, primary crank members arranged in co-axial alignment journalled on said casing, a secondary crank shaft having its ends journalled in the arms of the primary crank members, a planetary pinion mounted on said secondary crank shaft, a circular rack co-acting with the planetary pinion to reciprocate the crank pins in straight lines, a lay shaft geared at its ends with the primary cranks and maintaining the assemblage of said primary cranks in positive alignment and a fly wheel mounted on the lay shaft.

10. In an internal combustion engine, the combination of a crank casing, a plurality of co-axially arranged cylinders, pistons within said cylinders, a piston rod rigidly connected with said pistons, primary crank members arranged in co-axial alignment journalled on said casing, a secondary crank shaft having its ends journalled in the arms of the primary crank members, a planetary pinion on the secondary crank shaft, a fixed circular rack engaging the planetary pinion and co-acting therewith to constrain the crank pins of the secondary crank shaft to reciprocate with the piston rods in straight lines, a lay shaft geared at its opposite ends to the primary cranks and maintaining the assemblage of said primary and secondary cranks in positive alignment, and valve operating elements connected with said lay shaft.

11. In an internal combustion engine, the combination of a crank casing, a plurality of co-axially arranged cylinders, pumping chambers connected with said cylinders, receivers between the pumping chambers and the working ends of said cylinders, a plurality of pistons within said cylinders, a piston rod rigidly connected with said pistons, primary crank members arranged in co-axial alignment journalled on said casing, a secondary crank shaft having its ends journalled in the arms of the primary crank members, means for constraining the crank pins, a lay shaft geared at its ends to said primary crank members, and means connected with said lay shaft for controlling apertures connected with said chambers.

12. In an internal combustion engine, the combination of a crank casing, a plurality of co-axially arranged cylinders, pistons within said cylinders, a piston rod rigidly connected with said pistons, primary crank members arranged in co-axial alignment journalled on said casing, a secondary crank shaft having its ends journalled in the arms of the primary crank members, means for constraining the secondary crank pins and the piston rods to reciprocate in straight lines, a lay shaft provided on its ends with gears connected with pinions on the primary crank members, and maintaining the assemblage of said primary and secondary cranks in alignment, pumping chambers between the pistons and the covers of said cylinders, receivers between the pumping chambers and the working ends of said cylinders, inlet valves on the pumping chambers, outlet valves between the pumping chambers and the receivers, admission valves between the receivers and the working ends of the receivers, exhaust valves on the cylinders, and cams on the lay shaft engaging means for operating said valves.

In testimony that he claims the foregoing as his invention, he has signed his name.

MAURICE KAYE WILLIAMSON.